May 31, 1932.  M. A. DAVIS ET AL  1,861,426
FRUIT JUICE EXTRACTING IMPLEMENT
Filed Nov. 5, 1927
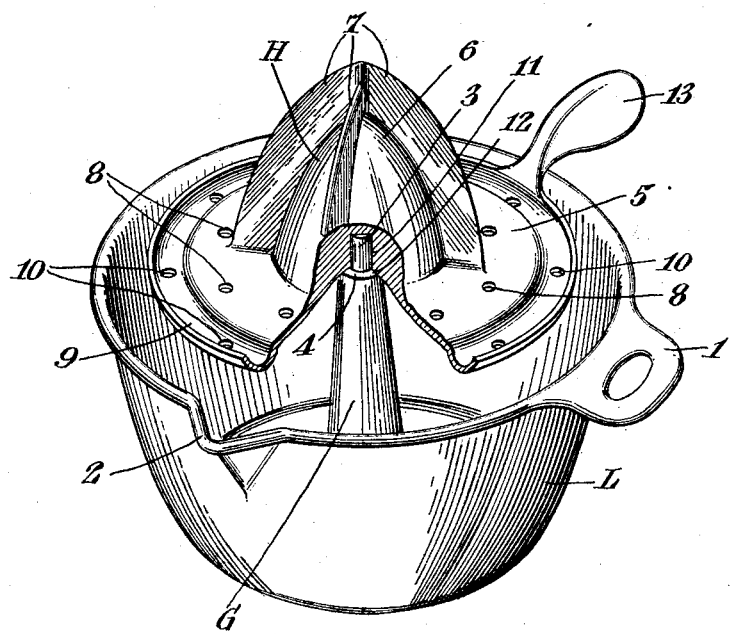
INVENTORS
Mansell A. Davis
John Kunst Patented May 31, 1932

1,861,426

UNITED STATES PATENT OFFICE

MANSELL A. DAVIS, OF WESTCHESTER, AND JOHN KUNST, OF NEW YORK, N. Y.; SAID KUNST ASSIGNOR TO SAID DAVIS

FRUIT JUICE EXTRACTING IMPLEMENT

Application filed November 5, 1927. Serial No. 231,205.

This invention relates to a fruit juice extracting implement, and an object of the invention is to provide an implement of this character which will be at once of dignified and attractive appearance and of strong, substantial and practical construction.

A more detailed object is to provide a fruit juice extracting implement made up of a minimum number of parts, one of the parts being adapted for the actual extracting operation, the other for rotatably supporting the first and receiving the extracted juice, and the first being readily removable for conveniently disposing of all parts of the fruit except the extracted juice.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to taken as a part of this specification, and in which I have shown merely a preferred form of embodiment of the invention, there is illustrated a perspective view of an implement constructed in accordance with the invention, a portion being broken away for a disclosure of details of construction.

Referring to the drawing for describing in detail the embodiment illustrated therein, the reference character L indicates the juice receiving part of the implement. This is in the form of a cup-like container and preferably has a hand grip as 1 exteriorly thereof and a lip as 2 for the convenient pouring of extracted juice.

Rising from the centre of the bottom wall of the part L, preferably, though not necessarily, integral therewith is a standard G, the upper end of which is provided with a vertical reduced cylindrical extension 3 serving as a pivot shaft upon which the extractor part H is mounted. An annular upwardly facing shoulder 4 is formed at the base of the extension 3 to serve as a thrust bearing for the extractor part.

The extractor part H comprises an annular base portion 5 from the centre of which rises the extractor proper 6, said extractor proper being of any appropriate form as is well known in devices of this character, and preferably including a suitable number of ribs as 7—7 for rubbing about against the inner surface of the fruit.

The base 5 is formed with an ample number of openings as 8—8 therethrough by which it is adapted to serve as a strainer for straining the material removed from the fruit by the extractor proper 6, and at its peripheral part is shaped to provide an annular groove as 9, there being additional strainer openings as 10—10 provided through the bottom wall of said groove.

At the underside of the base 5 centrally thereof is provided a bearing opening as 11 of proper size to receive the pivot shaft 3 and allow the adjacent undersurface portion as 12 of the base to rest upon the thrust bearing 4 in such manner that the extractor H may be readily rotated, or oscillated, upon and about the pivot shaft 3.

The fit of the bearing opening 11 upon the pivot shaft 3 is also such that the extractor H may readily be lifted off from the standard G and entirely removed at will for the easy discharge of the fruit after the juice extracting operation has been completed.

A handle as 13 is provided projecting from one side of the base 5 by which handle the extractor may be easily rotated, or oscillated, by the user.

The entire device may be made of glass, aluminum or other appropriate material, and the two parts of which it is comprised are sanitary and may be easily cleaned throughout.

In use a one-half of a fruit, as for instance an orange or a lemon, held in an inverted position, is pressed downwardly against the extractor proper 6 by one of the operator's hands, while with the other hand the operator rotates, or oscillates, the extractor upon its pivotal support by means of the handle 13. The extracted pulp and juice will flow downwardly on to the base 5, being strained through the openings 8 so that some of the juice will fall into the receiving part L. The lighter unstrained portions of the pulp and juice will flow into the groove 9 and there rest for final straining through the openings 10, it being noted that the continued rotary movement of the extractor will more or less violently agitate the material being strained so that the full amount of juice will be discharged into the receiver L.

After the extracting and straining operations have been completed the extractor part H, with the remaining fruit skin, seeds and pulp, may be quickly and easily lifted away by means of the handle 13 for disposing of these useless parts of the fruit and leaving the juice receiving part L with only the strained juice and free of encumbrance by the extractor part.

As many changes could be made in this construction without departing from the scope of the invention, as defined in the following claims, it is intended that all matter contained in the above description, or shown in the accompanying drawing, shall be interpreted as illustrative only and not in a limiting sense.

Having thus described our invention, what we claim as new and desire to secure by Letters Patent is:

1. The combination with a portable container intended to receive fruit juice therein, of a standard made up as a part of said container and projecting upwardly from the bottom wall thereof centrally of the container, said standard having an annular bearing part at its upper end, and a fruit juice extracting device rotatably mounted upon said bearing part and having a handle thereon by which it may be conveniently rotated with respect to the container.

2. A fruit juice extracting and straining implement comprising a main imperforate container having a central bearing therein, a combined juice extracting and straining device rotatably mounted upon said bearing, the bearing being constructed to permit ready separation of the extracting and straining device therefrom at will, and a handle provided upon said extracting and straining device by which to rotate said device with respect to the container and by which said device may be readily removed from the container.

3. As an article of manufacture, a fruit juice extracting implement consisting of two separately formed members, one of said members being shaped to provide a container for the fruit juice and having a bearing part formed integral therewith at its centre, the other member being shaped to provide an extractor device for rubbing against the fruit to extract the juice therefrom and a strainer for straining the juice and through which the juice is delivered into the first mentioned member, said second member being shaped also to provide a bearing part co-operative with the bearing part of the first member to pivotally and detachably connect the second member with the first member, and said second member being shaped also to provide a handle by which it may be conveniently manually rotated upon said bearing parts and by means of which the second member may be manually removed from the first member at will.

4. A fruit juice extracting and straining implement comprising a main container, a juice extracting device rotatably mounted upon the container, said juice extracting device including a base part and a juice extracting part rising centrally from the base part, the base part having openings therethrough serving as straining means for the extracted juice through which the juice will be discharged into the main container, and a handle connected directly with said base part by which to operate the juice extracting device.

5. In a fruit juice extractor, a juice extracting head adapted to be oscillated against an article of fruit, said head having an elongated handle extending radially from its periphery to facilitate the oscillation of said head.

6. In a fruit juice extractor, a juice receiving receptacle, an oscillatory juice extracting head supported by said receptacle, said head having an elongated handle extending radially therefrom at its periphery to facilitate the oscillation thereof.

7. As an article of manufacture, a fruit juice extracting implement comprising two separately formed members, one of said members being shaped to provide a container for the fruit juice and having means providing a pivot bearing part at the centre of said mentioned member, the other member being shaped to constitute first an extractor device for rubbing against the fruit to extract the juice therefrom, second a strainer device for straining the juice and through which the juice is delivered into the first mentioned member, third a pivot bearing part to engage the pivot bearing part of the first member to oscillatably connect the second member with the first member, and fourth a handle by which to manually oscillate said second member with respect to the first member.

8. In a fruit juice extractor, a juice extracting head adapted to be oscillated against an article of fruit and having a strainer connected to the lower part thereof to oscillate therewith, means to removably oscillatably support said head, and said head having a handle extending radially and directly therefrom by which to handle and to manually oscillate said head and strainer.

9. In a fruit juice extractor, a container, a post rising from the bottom wall of said container, a juice extracting head removably oscillatably mounted upon said post, juice straining means connected with said juice extracting head to oscillate therewith, and a handle by which to manually oscillate said juice extracting head and said juice straining means said handle being formed as an integral extension projecting radially directly upon the juice straining means.

In testimony whereof we affix our signatures.

MANSELL A. DAVIS.
JOHN KUNST.